(12) United States Patent
Shih (10) Patent No.: US 9,061,547 B2
(45) Date of Patent: Jun. 23, 2015

(54) POWER-OPERATED CASTER BRAKE MECHANISM

(75) Inventor: Pao Ming Shih, Taipei (TW)

(73) Assignee: CAREMED SUPPLY INC., New Taipei (TW)

( * ) Notice: Subject to any disclaimer, the term of this patent is extended or adjusted under 35 U.S.C. 154(b) by 375 days.

(21) Appl. No.: 13/336,934

(22) Filed: Dec. 23, 2011

(65) Prior Publication Data

US 2013/0160237 A1    Jun. 27, 2013

(51) Int. Cl.
*B60B 33/02*    (2006.01)
*B60B 33/00*    (2006.01)

(52) U.S. Cl.
CPC .......... *B60B 33/021* (2013.01); *Y10T 16/1853* (2015.01); *B60B 33/0042* (2013.01); *B60B 33/0049* (2013.01); *B60B 33/0057* (2013.01); *B60B 33/0068* (2013.01); *B60B 33/0073* (2013.01); *B60B 33/025* (2013.01); *B60B 33/026* (2013.01); *B60B 2200/242* (2013.01); *B60B 2900/531* (2013.01)

(58) Field of Classification Search
CPC .. B60B 33/021; B60B 33/025; B60B 33/026; B60B 33/0042; B60B 2200/242; Y10T 16/1853
USPC .................................... 188/1.12, 19; 16/35 R
See application file for complete search history.

(56) References Cited

U.S. PATENT DOCUMENTS

| | | | |
|---|---|---|---|
| 6,321,878 B1 * | 11/2001 | Mobley et al. ............... | 188/1.12 |
| 7,712,184 B1 * | 5/2010 | Lewis et al. .................. | 16/35 R |
| 2002/0088055 A1 * | 7/2002 | Vogel et al. ....................... | 5/600 |
| 2004/0163175 A1 * | 8/2004 | Vogel et al. ....................... | 5/620 |
| 2007/0044272 A1 * | 3/2007 | Misin ............................ | 16/35 R |
| 2007/0056141 A1 * | 3/2007 | Armano et al. ............... | 16/35 R |
| 2008/0086815 A1 * | 4/2008 | Kappeler et al. .................. | 5/600 |
| 2008/0120810 A1 * | 5/2008 | Reckelhoff et al. ........... | 16/35 R |
| 2011/0162141 A1 * | 7/2011 | Lemire et al. ..................... | 5/510 |

* cited by examiner

*Primary Examiner* — Robert A Siconolfi
*Assistant Examiner* — Charles Poon
(74) *Attorney, Agent, or Firm* — Shimokaji & Associates, P.C.

(57) ABSTRACT

A power-operated caster brake mechanism includes a driving device having a driving motor; a linking mechanism having a shifting member connected to a moving bar of the driving motor, and two rotating members connected to two ends of the shifting member; a caster connected to each rotating member and including a wheel and a brake and direction-lock mechanism, the latter including a brake block located in a wheel support, and a pin connected at an end to the brake block and another end to the rotating member; and a mechanical switch connected to the moving bar. When the driving motor shifts the shifting member, the rotating members rotate the brake blocks to different positions, bringing the casters to a braked, a direction-locked, or a freely swiveling state. In case the driving motor is failed, the casters can still be set to a desired operating state with the mechanical switch.

11 Claims, 10 Drawing Sheets

POWER-OPERATED CASTER BRAKE MECHANISM

FIELD OF THE INVENTION

The present invention relates to a brake mechanism for casters mounted to legs of a wheel-supported hospital bed, and more particularly to a power-operated caster brake mechanism capable of setting the casters to a braked state, a direction-locked state, or a freely swiveling state according to actual need.

BACKGROUND OF THE INVENTION

Casters have been widely applied to many products that are designed for moving easily. To meet the requirements in the market and of the consumers, casters have been developed from having one simple function of rolling to having many other technical features at the same time, such as being single-braking, double-braking and/or direction-lockable.

Figure 1:
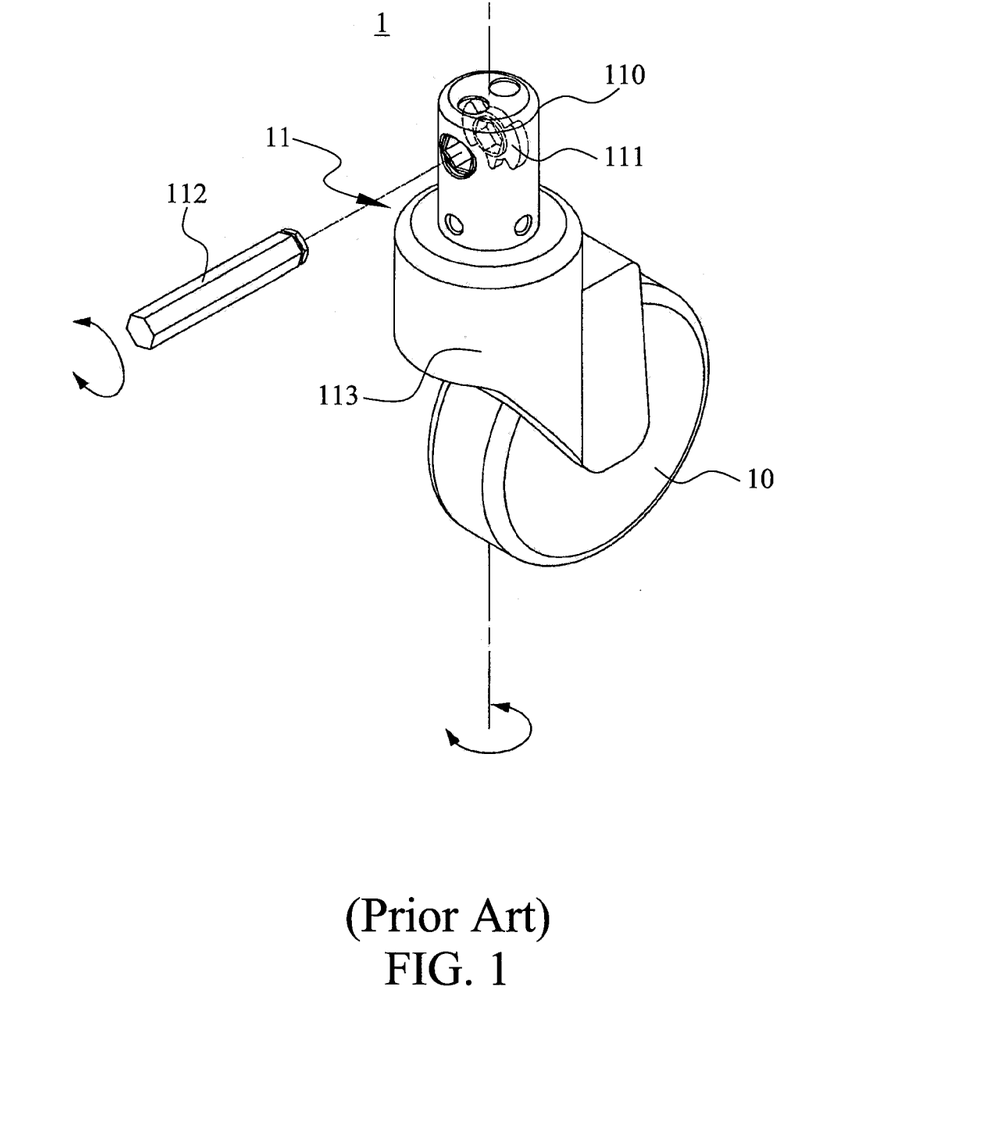
FIG. 1 shows the structure of a general caster for a wheel-supported hospital bed.

FIG. 1 shows a conventional caster 1 for mounting to each of four legs or four lower corners of a wheel-supported hospital bed. As shown, the caster 1 is of the type provided with braking and direction-locking functions, and it mainly includes a wheel 10 and a braking and direction-locking mechanism 11. The braking and direction-locking mechanism 11 includes an upper barrel 110, a special brake block 111 provided in the barrel 110, a pin 112 extended through the brake block 111 for controlling the latter to rotate, and a wheel support 113 connected to a lower end of and freely swiveling relative to the barrel 110. By rotating the brake block 111 to three different positions with the pin 112, the wheel 10 can be set to one of three different operating states, namely, a braked state, a direction-locked state, and a freely swiveling state.

In the braked state, the wheel 10 is stopped from rolling by a stopping means in the wheel support 113, and the wheel support 113 can not freely swivel relative to the barrel 110. In the direction-locked state, the stopping means in the wheel support 113 is released, so that the wheel 10 can roll while the wheel support 113 can not freely swivel relative to the barrel 110, restricting the wheel 10 to roll and move in a fixed direction. In the freely swiveling state, the wheel 10 can roll and the wheel support 113 can freely swivel relative to the barrel 110.

Figure 2:
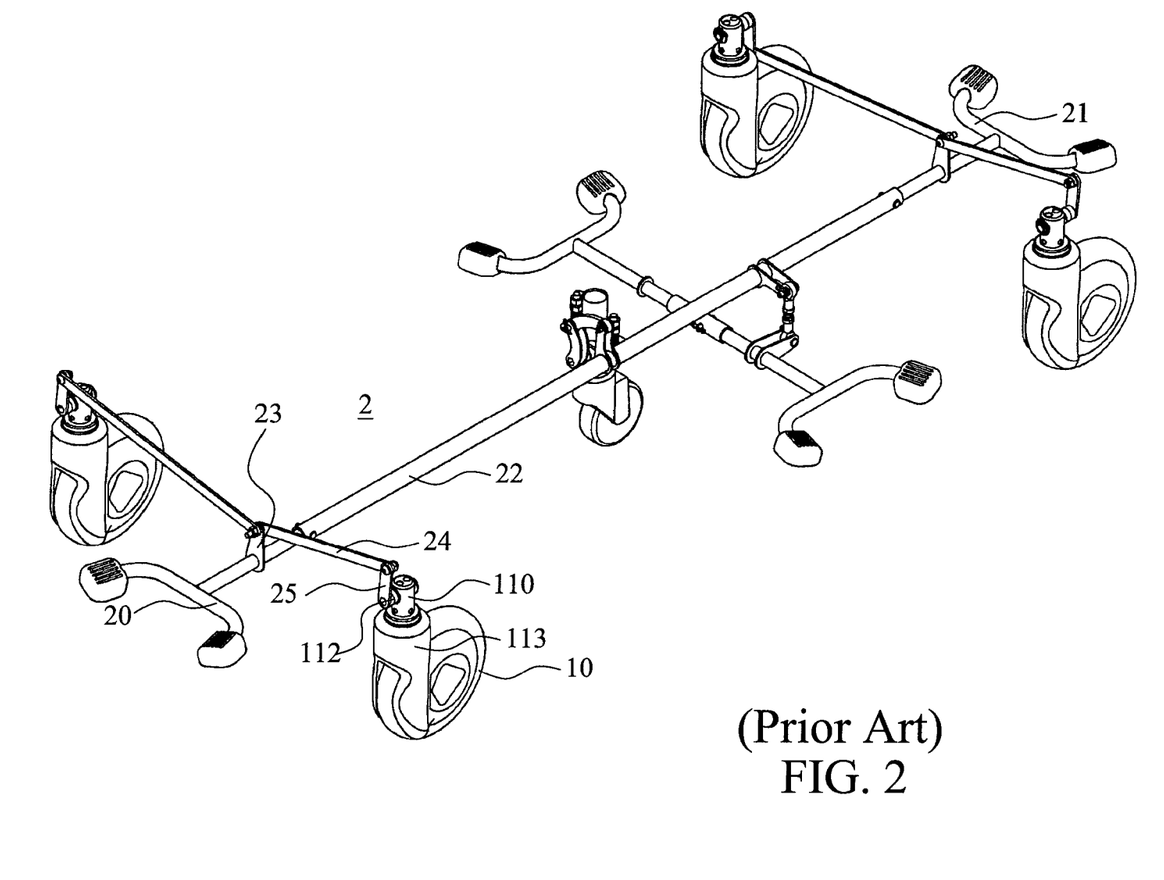
FIG. 2 is an exploded perspective view showing a conventional caster control structure for the conventional wheel-supported medical bed.

FIG. 2 shows the caster 1 shown in FIG. 1 is usually connected to a caster control mechanism 2 for use. As shown, the caster control mechanism 2 includes a first control lever 20, a second control lever 21, an axial shaft 22 extended between and connected to the first and the second control lever 20, 21, a first pivoting rod 23 provided near each of two opposite ends of the axial shaft 22, two transverse shifting bars 24 coaxially connected at respective inner end to each of the first pivoting rods 23, and a second pivoting rod 25 connected to an outer end of each of the transverse shifting bars 24. Finally, four casters 1 are separately connected at the pins 112 to the second pivoting rods 25.

The first and the second control lever 20, 21 have three different operating positions. The first operating position serves to control the casters 1 to a freely swiveling state, the second operating position serves to control the casters 1 to a direction-locked state, and the third operating position serves to control the casters 1 to a braked state.

With the conventional caster control mechanism 2 provided below the hospital bed, a user may step any of the first and the second control lever 20, 21 for setting the casters 1 to the freely-swiveling state to move in any direction, or to the direction-locked state to move in one fixed direction, or to the braked state to immovably stand on floor.

However, since the conventional caster control mechanism 2 is provided below the hospital bed, it is possible the first and the second control lever 20, 21 are unexpectedly contacted by someone and changed into a non-desired operating state. On the other hand, the first and second control levers 20, 21 have three different operating positions. For a user who is not experienced in operating the wheel-supported hospital bed, it is uneasy to quickly switch the casters 1 to a desired operating state via the control levers 20, 21. Thus, the conventional caster control mechanism 2 and the conventional caster structure 1 are not so convenient for use.

It is therefore tried by the inventor to develop an improved power-operated caster brake mechanism to overcome the disadvantages of the conventional caster control mechanism 2 and the conventional caster structure 1.

SUMMARY OF THE INVENTION

A primary object of the present invention is to provide a power-operated caster brake mechanism for wheel-supported hospital bed, so that casters connected to the legs of the hospital bed can be easily set to a braked state, a direction-locked state or a freely swiveling state according to actual need in use, making the wheel-supported hospital bed more convenient for use.

Another object of the present invention is to provide a power-operated caster brake mechanism that further includes a manually controllable mechanical switch, so that the casters can also be manually set to different operating states in case the caster brake mechanism could not be normally electrically operated to switch the casters among different operating states under some special or unexpected condition.

A further object of the present invention is to provide a power-operated caster brake mechanism that includes a cabled or a wireless control device mounted on the hospital bed at a suitable position, so that the power-operated caster brake mechanism can be quickly and conveniently controlled with the control device.

To achieve the above and other objects, the power-operated caster brake mechanism according to the present invention includes a driving device, a linking mechanism, a plurality of casters, and a mechanical switch. The driving device includes a driving motor, a driving sleeve externally connected to one lateral side of the driving motor, and a moving bar received in and sliding relative to the driving sleeve; and the moving bar has a first end and an opposite second end. The linking mechanism includes a shifting member connected to the first end of the moving bar of the driving device, and a rotating member turnably connected to each of two opposite ends of the shifting member. The casters are separately connected to each of the rotating members of the linking mechanism, and respectively include a braking and direction-locking mechanism and a wheel movably connected to the braking and direction-locking mechanism. The braking and direction-locking mechanism includes a wheel support, a brake block located in the wheel support, and a pin perpendicularly extended into the wheel support. The pin has an end connected to the rotating member of the linking mechanism and an opposite end connected to the brake block. The mechanical switch is connected to the second end of the moving bar.

When the driving device is actuated, the linking mechanism is brought to move and accordingly rotates the brake blocks in the casters to different positions, bringing the casters to one of a braked state, a direction-locked state, and a freely swiveling state according to actual need.

The mechanical switch includes a rotating rod, a first pivot shaft, and a follower assembly. The first pivot shaft has an end connected to the rotating rod and another opposite end connected to an end of the follower assembly, and the follower assembly is connected at another opposite end to the second end of the moving bar of the driving device.

In an operable embodiment, the mechanical switch further includes a hand tool, which has a socket for engaging with the rotating rod and a force-application bar integrally extended from the socket for a user to apply a force thereat to manually switch the casters among different operating states.

The follower assembly includes two curved plates, a second pivot shaft, and a swing arm. The two curved plates respectively have an end movably connected to two laterally opposite sides of the second end of the moving bar and another opposite end connected to the second pivot shaft. The swing arm is located between the two curved plates and has an end connected to the second pivot shaft and another opposite end connected to the first pivot shaft.

In a preferred embodiment, the power-operated caster brake mechanism further includes a housing for receiving the driving device and the linking mechanism therein while the casters are partially exposed from the housing.

The housing internally defines a receiving space, in which the driving device and the linking mechanism are mounted; and is provided near each of two axially opposite lower ends with a first opening, via which the caster is extended from an outer side into the housing and connected to the linking mechanism. The housing is also provided near each of the two axially opposite lower ends with a second opening, and is so configured that two inward curved recesses are formed on a front side thereof adjacent to the two axially opposite ends. The two opposite ends of the shifting member of the linking mechanism are extended out of the housing via the two second openings to connect to the rotating members.

Moreover, the housing is further provided on a rear outer side with at least one connector for correspondingly assembling to a frame of the wheel-supported hospital bed. The connector includes a hollow pipe portion and two mounting brackets separately outwardly extended from two laterally opposite sides of the hollow pipe portion; and the mounting brackets are fixedly connected to the frame of the wheel-supported hospital bed by screwing at least one fastening element through the two mounting brackets.

In another preferred embodiment, the power-operated caster brake mechanism further includes a control device electrically connected to the driving device. The control device includes a control unit having an operation interface, via which a control command for braking, direction-locking or freely swiveling the casters can be sent; and a transmission unit located between the driving device and the control unit for receiving the control command from the control unit and sending the received control command to the driving device.

In an operable embodiment, the transmission unit is a transmission cable having an end electrically connected to the control unit and another opposite end electrically connected to the driving device.

In another operable embodiment, the transmission unit is a wireless transmission device, which includes a signal emitter electrically connected to the control unit and a signal receiver electrically connected to the driving device.

The present invention is advantageously characterized in that the driving device, the linking mechanism and the casters work in a coordinating manner, so that the casters can be electrically controlled to a braked state, a direction-locked state or a freely swiveling state according to actual need; and that the mechanical switch can be used to manually control the operating state of the casters when the caster brake mechanism could not be electrically controlled; and that the driving device can be electrically connected to a cabled or a wireless control device for a user to quickly and conveniently control the casters to different operating states with the control device.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof and with reference to the accompanying drawings. For the purpose of easy to understand, elements that are the same in the preferred embodiments are denoted by the same reference numerals.

Please refer to FIGS. 3 to 6. A power-operated caster brake mechanism according to a preferred embodiment of the present invention includes a driving device 30, a linking mechanism 40, a plurality of casters 50, a housing 60, and a mechanical switch 70.

The driving device 30 includes a driving motor 31; a driving sleeve 32 externally connected to one lateral side of the driving motor 31 and internally defining an axial bore 33; and a moving bar 34 received in the axial bore 33 and axially slidable relative to the driving sleeve 32. The moving bar 34 has a first end 341 and an opposite second end 342, and the first end 341 is provided with an axially extended notch 343.

The linking mechanism 40 includes a shifting member 41 connected to the first end 341 of the moving bar 34; and a rotating member 42 turnably connected to each of two opposite ends of the shifting member 41. The shifting member 41 is configured as a transverse link 411, which includes a downward projection 412 for inserting into the notch 343. The projection 412 in the notch 343 is pivotally connected to the first end 341 of the moving bar 34 with a screw bolt 413. Each of the rotating members 42 includes a cylindrical portion 421 and an arm portion 422 outward extended from the cylindrical portion 421. The arm portions 422 of the two rotating members 42 are pivotally connected to the two opposite ends of the transverse link 411 with two bolts 423.

It is understood the shifting member 41 is not necessarily restricted to the transverse link 411 as illustrated in the preferred embodiment of the present invention, but can be otherwise configured as a transverse member having an I-shaped cross section (not shown). In the latter case, four rotating members 42 can be connected to four corners of the I-shaped transverse member, and four casters 50 can be connected to the four rotating members 42 and be controlled at the same time.

Figure 6:
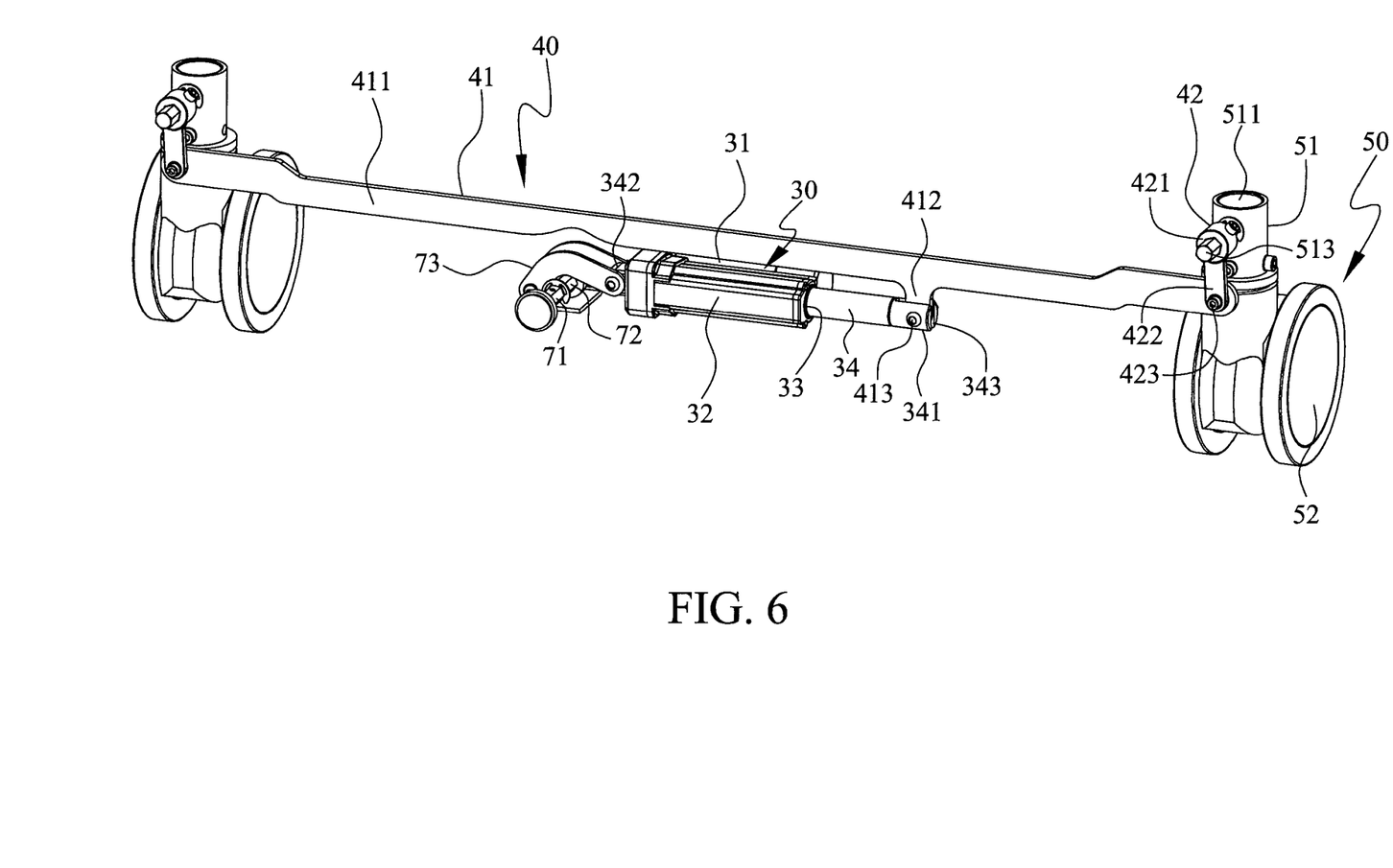
FIG. 6 is a perspective view showing a subassembly of a driving device, a linking mechanism, a mechanical switch, and two casters of the power-operated caster brake mechanism of the present invention.

Each of the casters 50 includes a braking and direction-locking mechanism 51 and a wheel 52 movably connected to the braking and direction-locking mechanism 51. The braking and direction-locking mechanism 51 includes a wheel support 511, a brake block 512 located in the wheel support 511, and a pin 513 perpendicularly extended into the wheel support 511. The pin 513 has an end extended through the cylindrical portion 421 to connect to the rotating member 42; and an opposite end extended into the wheel support 511 to connect to the brake block 512.

When the driving device 30 is actuated, the linking mechanism 40 is brought to move synchronously. The moving linking mechanism 40 in turn rotates the brake blocks 512 in the wheel supports 511 of the casters 50 to different positions. With the aid of a stop structure (not shown) in each of the casters 50, the driving device 30 and the linking mechanism 40 can selectively bring the casters 50 to one of three states, namely, a braked state, a direction-locked state, and a freely swiveling state.

The driving device 30 and the linking mechanism 40 are received in the housing 60, while the casters 50 are partially exposed from the housing 60.

Figure 4:
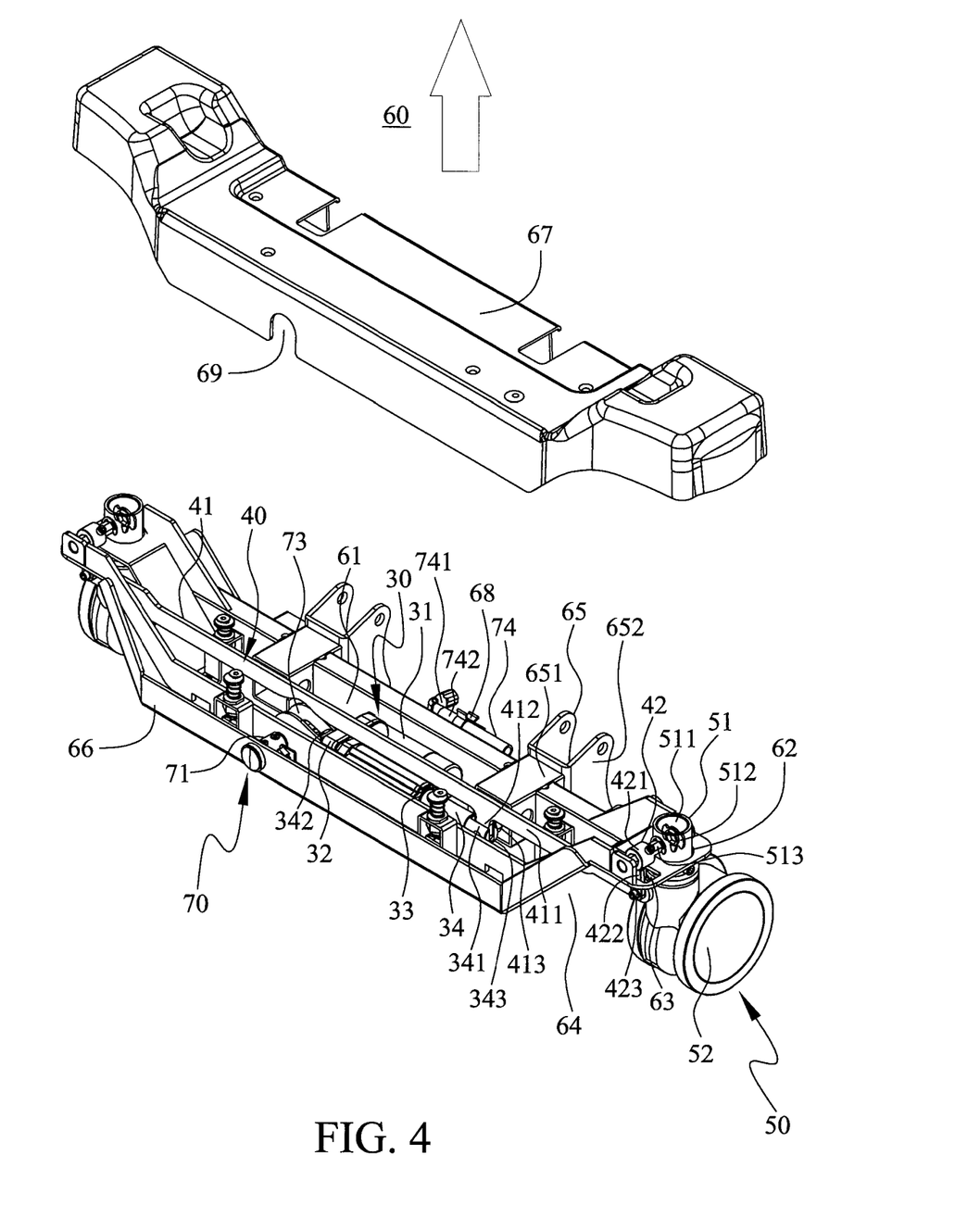
FIG. 4 shows the power-operated caster brake mechanism of FIG. 3 with a top cover separated from a bottom base of a housing of the power-operated caster brake mechanism of the present invention.
Figure 5:
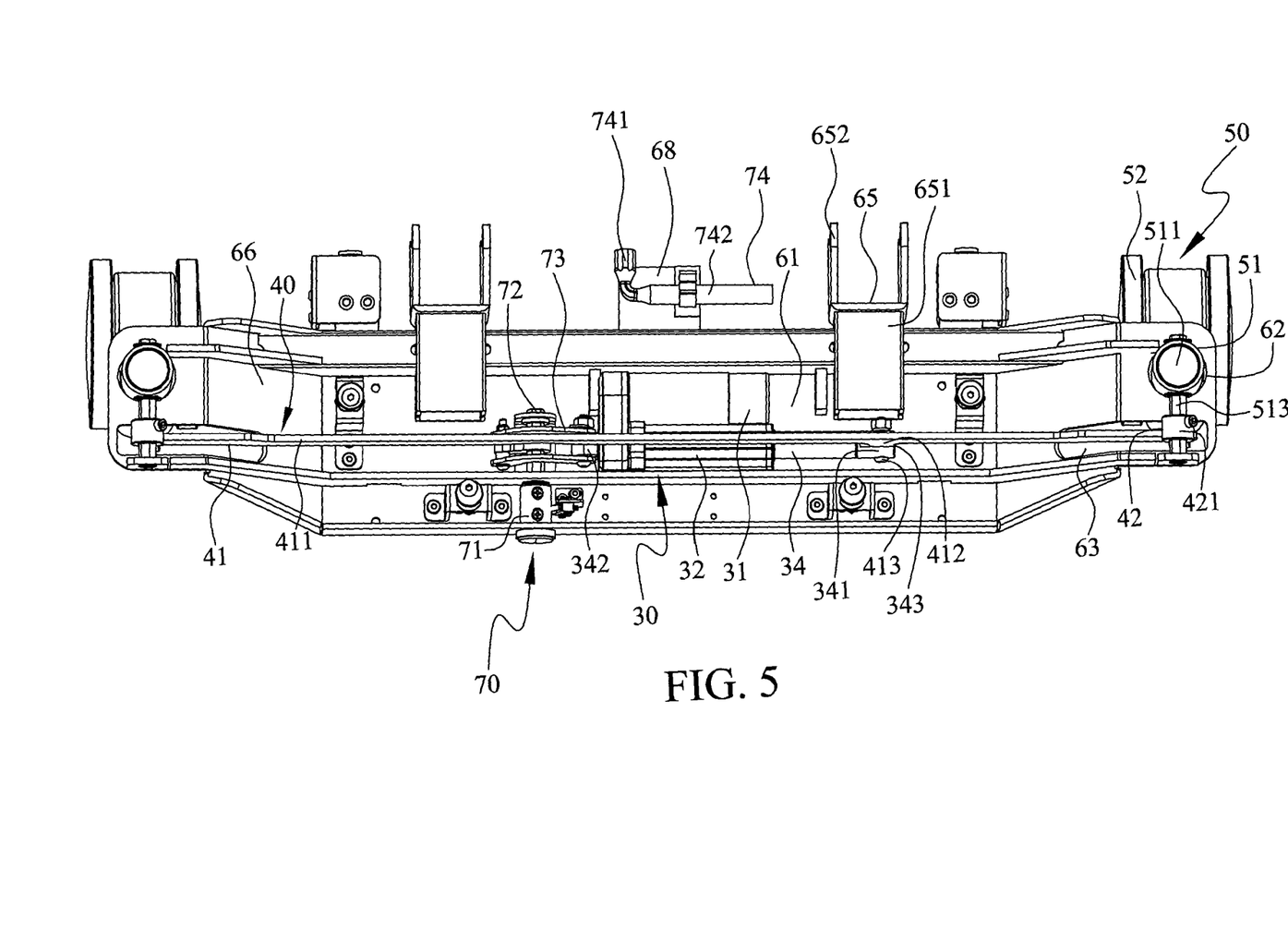
FIG. 5 is a top view showing the structures mounted on the bottom base of the housing of the power-operated caster brake mechanism.

In the illustrated preferred embodiment, the housing 60 internally defines a receiving space 61, in which the driving device 30 and the linking mechanism 40 are mounted. The housing 60 is provided near each of two axially opposite lower ends with a first opening 62, via which the caster 50 is extended from an outer side into the housing 60 and connected to the linking mechanism 40.

Figure 3:
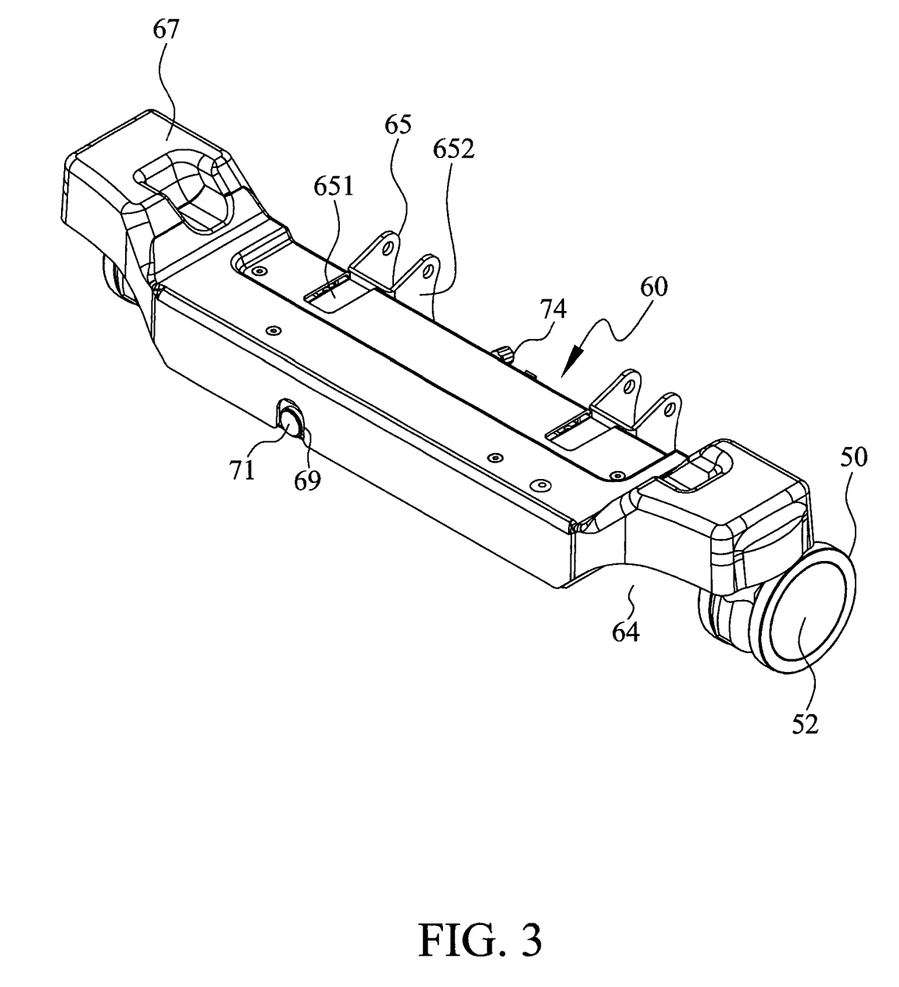
FIG. 3 is an assembled perspective view of a power-operated caster brake mechanism according to the present invention.

The housing 60 is further provided near each of the two axially opposite lower ends with a second opening 63, and the housing 60 is so configured that two inward curved recesses 64 are formed on a front side thereof adjacent to the two axially opposite ends, as can be most clearly seen in FIG. 3. The two opposite ends of the shifting member 41 of the linking mechanism 40 are extended out of the housing 60 via the two second openings 63 to connect to the rotating members 42.

The housing 60 is further provided on a rear outer side with two connectors 65 for correspondingly assembling to a frame of a wheel-supported hospital bed. Each of the connectors 65 includes a hollow pipe portion 651 and two mounting brackets 652 separately outwardly extended from two laterally opposite sides of the hollow pipe portion 651. The mounting brackets 652 of each connector 65 are fixedly connected to the frame of the wheel-supported hospital bed by screwing at least one fastening element through the two mounting brackets 652.

In an operable embodiment, the housing 60 is assembled from a bottom base 66 and a top cover 67. The two connectors 65 are arranged near two axially opposite rear ends of the bottom base 66 to space from each other. The bottom base 66 is also provided between the two connectors 65 with a holder 68 for holding some other articles thereto. The bottom base 66 and the top cover 67 are correspondingly provided on respective front side with a hole to form a third opening 69 on the housing 60.

Figure 7:
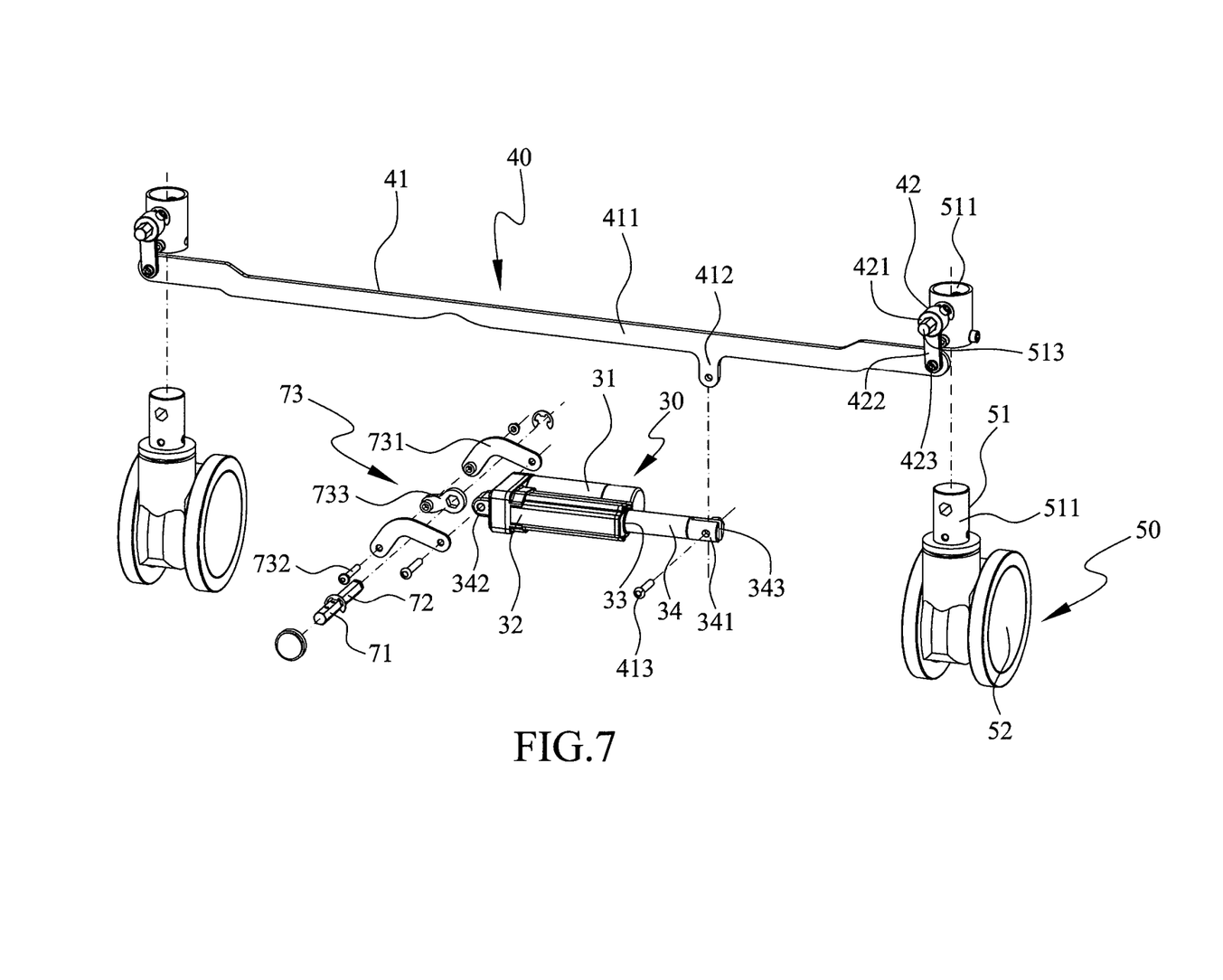
FIG. 7 is an exploded view of FIG. 6.

Please refer to FIGS. 6 and 7. The mechanical switch 70 is connected to the second end 342 of the moving bar 34 of the driving device 30. The mechanical switch 70 includes a rotating rod 71, a first pivot shaft 72, and a follower assembly 73. The rotating rod 71 is mounted in the third opening 69. The first pivot shaft 72 has an end connected to the rotating rod 71 and another opposite end connected to an end of the follower assembly 73. The follower assembly 73 has another opposite end connected to the second end 342 of the moving bar 34.

In an operable embodiment, the follower assembly 73 includes two curved plates 731, a second pivot shaft 732, and a swing arm 733. The two curved plates 731 respectively have an end movably connected to two laterally opposite sides of the second end 342 of the moving bar 34 and another opposite end connected to the second pivot shaft 732. The swing arm 733 is located between the two curved plates 731, and has an end connected to the second pivot shaft 732 and another opposite end connected to the first pivot shaft 72.

Figure 8:
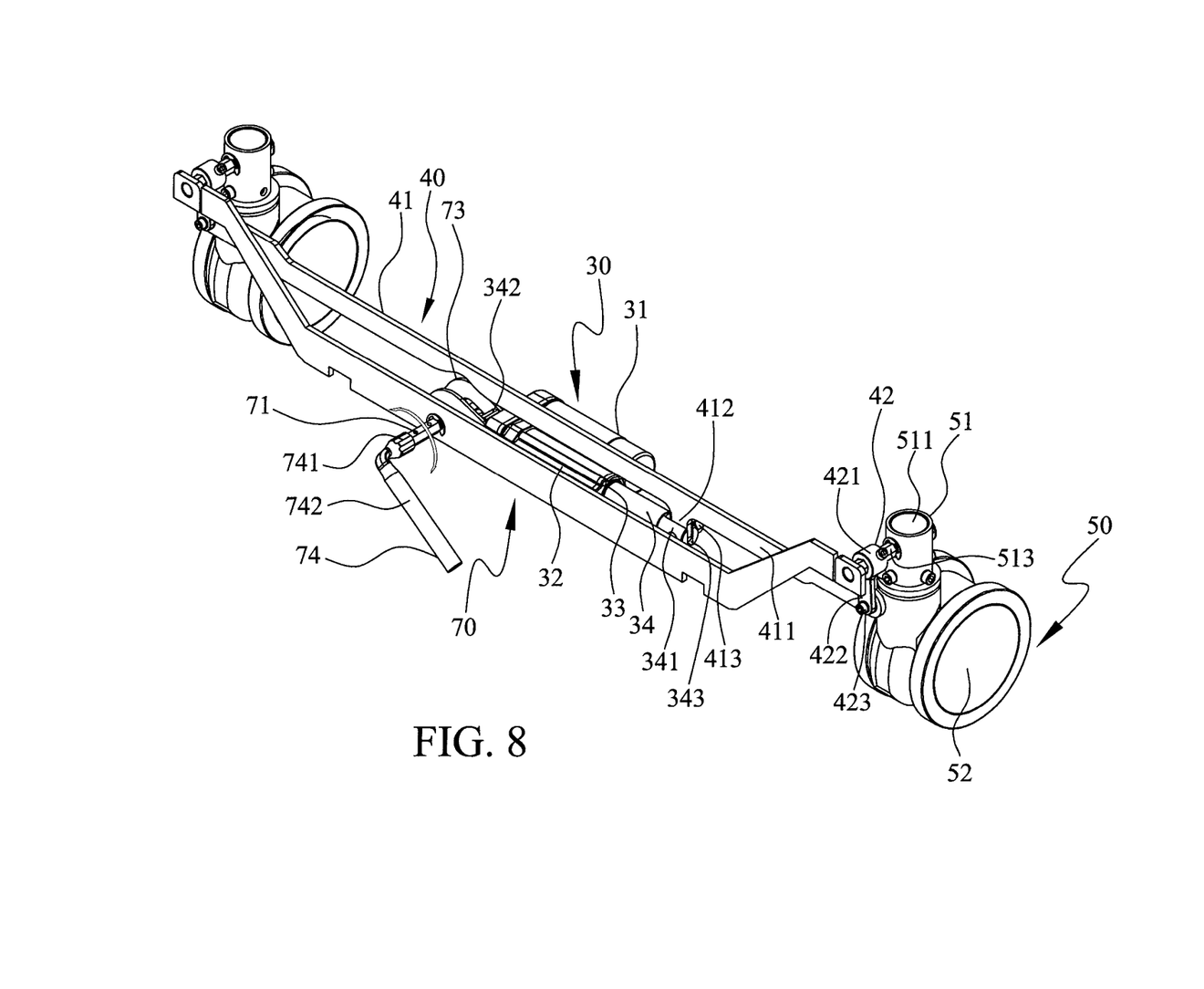
FIG. 8 illustrates a mechanical switch of the power-operated caster brake mechanism of the present invention operated with a hand tool.

Please refer to FIGS. 5 and 8. In the illustrated preferred embodiment, the mechanical switch 70 further includes a hand tool 74. The hand tool 74 has a socket 741 for engaging with the rotating rod 71; and a force-application bar 742 integrally extended from the socket 741. By applying force at the force-application bar 742, a user may conveniently manually switch the casters 50 among different operating states. When the hand tool 74 is not in use, the user may place it in the holder 68 on the front side of the bottom base 66.

It is understood the mechanical switch 70 is not necessarily restricted to the illustrated preferred embodiment but can be differently configured. That is, the rotating rod 71 of the mechanical switch 70 can be directly configured as, for example, a hand wheel or a turning knob that can be conveniently rotated without using an additional hand tool 74.

Figure 9:
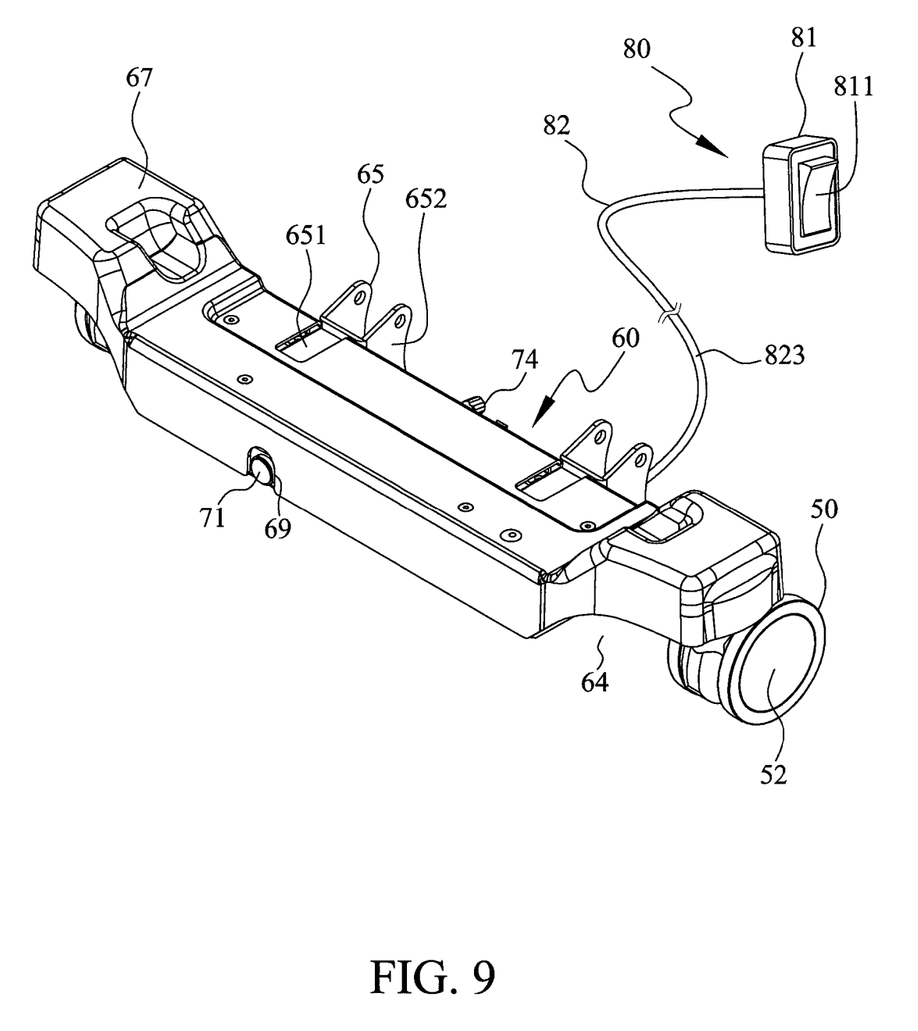
FIG. 9 shows an operable embodiment of a control device for the power-operated caster brake mechanism of the present invention.

Please refer to FIG. 9. The power-operated caster brake mechanism of the present invention further includes a control device 80 electrically connected to the driving device 30. The control device 80 includes a control unit 81 having an operation interface 811, via which a control command for braking, direction-locking or freely swiveling the casters can be sent; and a transmission unit 82 located between the driving device 30 and the control unit 81 for receiving the control command from the control unit 81 and sending the received control command to the driving device 30. By operating the control device 80 directly, a user may achieve the purpose of switching the casters 50 among different operating states.

According to an operable embodiment of the control device 80 as shown in FIG. 9, the transmission unit 82 is a transmission cable 823, which has an end electrically connected to the control unit 81 and another end electrically connected to the driving device 30.

Figure 10:
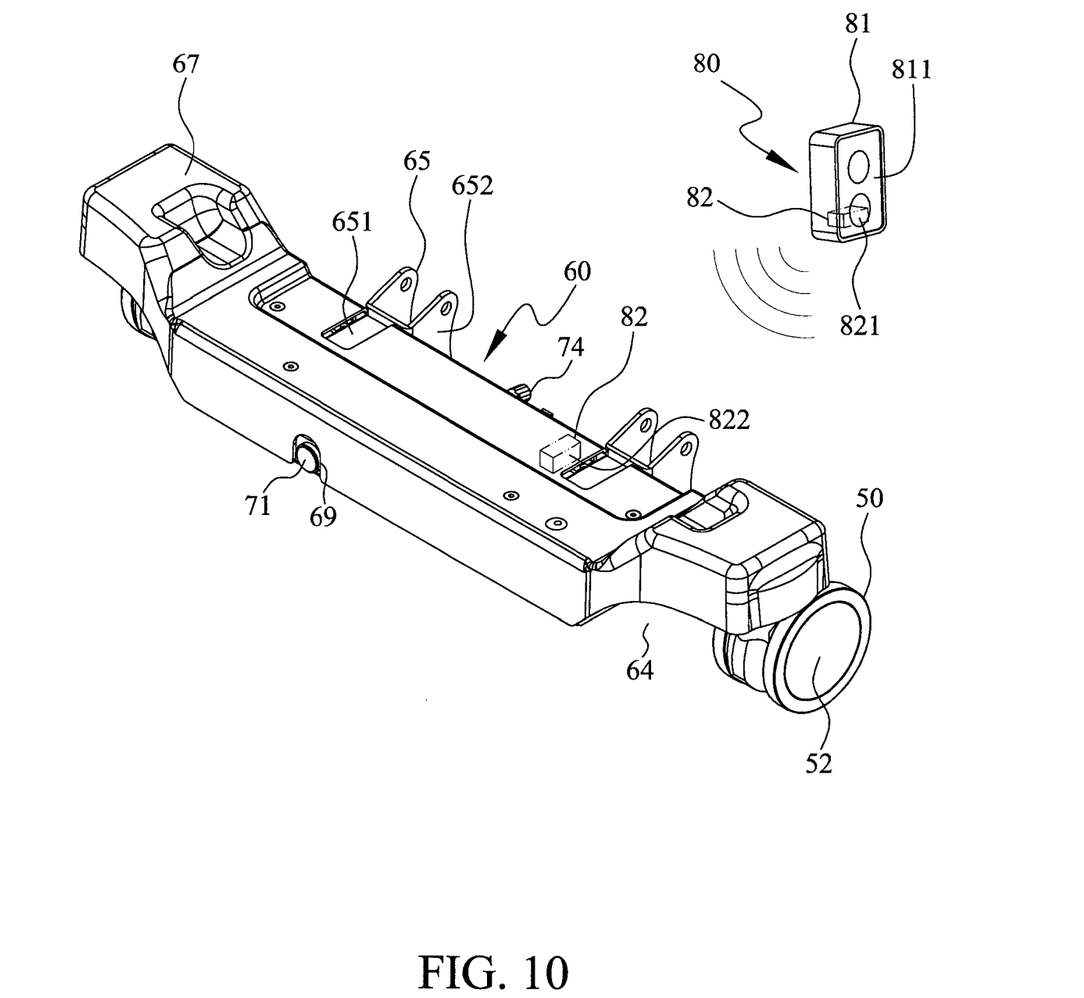
FIG. 10 shows another operable embodiment of the control device for the power-operated caster brake mechanism of the present invention.

Alternatively, according to another operable embodiment of the control device 80 as shown in FIG. 10, the transmission unit 82 is a wireless transmission device, which includes a signal emitter 821 electrically connected to the control unit 81 and a signal receiver 822 electrically connected to the driving device 30.

In summary, with the power-operated caster brake mechanism according to the present invention, the casters connected to the legs of a hospital bed can be switched among different operating states, including a braked state, a direction-locked state, and a freely swiveling state, according to actual need in use, so that the wheel-supported hospital bed is more convenient for use. The power-operated caster brake mechanism of the present invention includes a manually controlled mechanic switch, so that the casters can also be manually set to different operating states in case the caster brake mechanism could not be normally electrically operated to switch the casters among different operating states under some special or unexpected condition. Further, the present invention includes a cabled or a wireless control device mounted on the wheel-supported hospital bed at a suitable position, so that the caster brake mechanism can be quickly and conveniently operated with the control device.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A power-operated caster brake mechanism, comprising:
    a driving device including a driving motor, a driving sleeve externally connected to one lateral side of the driving motor, the driving sleeve not movable relative to the driving motor, and a moving bar received in and sliding relative to the driving sleeve; and the moving bar having a first end and an opposite second end;
    a linking mechanism including a shifting member directly connected to the first end of the moving bar of the driving device, and a rotating member turnably connected to each of two opposite ends of the shifting member;
    a caster being connected to each of the rotating members of the linking mechanism, and including a braking and direction-locking mechanism and a wheel movably connected to the braking and direction-locking mechanism, wherein the caster is connected at the braking and direction-locking mechanism to the rotating member;
    a mechanical switch, having a rotating rod, a first pivot shaft, and a follower assembly, wherein the first pivot shaft includes a first end connected to the rotating rod and a second end connected to a first end of the follower assembly, and a second end of the follower assembly being connected to the second end of the moving bar of the driving device; and
    a control device electrically connected to the driving device, comprising: a control unit having an operation interface, via which a control command for braking, direction-locking or freely swiveling the casters can be sent, and a transmission unit located between the driving device and the control unit for receiving the control command from the control unit and sending the received control command to the driving device,
    wherein when the driving device is actuated, the linking mechanism is brought to move and accordingly selectively sets the casters to one of a braked state, a direction-locked state, and a freely swiveling state.

2. The power-operated caster brake mechanism as claimed in claim 1, wherein the braking and direction-locking mechanism includes a wheel support, a brake block located in the wheel support, and a pin perpendicularly extended into the wheel support; and the pin having an end connected to the rotating member of the linking mechanism and an opposite end connected to the brake block.

3. The power-operated caster brake mechanism as claimed in claim 1, wherein the mechanical switch further includes a hand tool;
    the hand tool having a socket for engaging with the rotating rod, and a force-application bar integrally extended from the socket for a user to apply a force to manually switch the casters among different operating states.

4. The power-operated caster brake mechanism as claimed in claim 1, wherein the follower assembly includes two curved plates, a second pivot shaft, and a swing arm; the two curved plates respectively having a first end movably connected to two laterally opposite sides of the second end of the moving bar and a second end connected to the second pivot shaft; and the swing arm being located between the two curved plates and having a first end connected to the second pivot shaft and a second end connected to the first pivot shaft.

5. The power-operated caster brake mechanism as claimed in claim 1, further comprising a housing for receiving the driving device and the linking mechanism therein while the casters are partially exposed from the housing.

6. The power-operated caster brake mechanism as claimed in claim 5, wherein the housing internally defines a receiving space, in which the driving device and the linking mechanism are mounted; and is provided near each of two axially opposite lower ends with a first opening, via which the caster is extended from an outer side into the housing and connected to the linking mechanism.

7. The power-operated caster brake mechanism as claimed in claim 6, wherein the housing is further provided near each of the two axially opposite lower ends with a second opening, and the housing is so configured that two inward curved recesses are formed on a front side thereof adjacent to the two axially opposite ends; and the two opposite ends of the shifting member of the linking mechanism being extended out of the housing via the two second openings to connect to the rotating members.

8. The power-operated caster brake mechanism as claimed in claim 6, wherein the housing is further provided on a rear outer side with at least one connector for assembling to a frame of a wheel-supported hospital bed.

9. The power-operated caster brake mechanism as claimed in claim 8, wherein the connector includes a hollow pipe portion and two mounting brackets separately outwardly extended from two laterally opposite sides of the hollow pipe portion; and the mounting brackets being fixedly connected to the frame of the wheel-supported hospital bed by screwing at least one fastening element through the two mounting brackets.

10. The power-operated caster brake mechanism as claimed in claim 1, wherein the transmission unit is a transmission cable having an end electrically connected to the control unit and another opposite end electrically connected to the driving device.

11. The power-operated caster brake mechanism as claimed in claim 1, wherein the transmission unit is a wireless transmission device, which includes a signal emitter electrically connected to the control unit and a signal receiver electrically connected to the driving device.

* * * * *